(12) United States Patent
Kompe et al.

(10) Patent No.: US 7,890,862 B2
(45) Date of Patent: Feb. 15, 2011

(54) HAPTIC KEY CONTROLLED DATA INPUT

(75) Inventors: Ralf Kompe, Röttenbach (DE); Jason Williams, Middlesex (GB)

(73) Assignee: Sony Deutschland GmbH, Cologne (DE)

( * ) Notice: Subject to any disclaimer, the term of this patent is extended or adjusted under 35 U.S.C. 154(b) by 575 days.

(21) Appl. No.: 11/038,447

(22) Filed: Jan. 19, 2005

(65) Prior Publication Data

US 2005/0184959 A1 Aug. 25, 2005

(30) Foreign Application Priority Data

Jan. 20, 2004 (EP) .................................. 04001101

(51) Int. Cl.
 *G06F 3/01* (2006.01)
 *G06F 3/00* (2006.01)
 *G06F 3/048* (2006.01)

(52) U.S. Cl. ...................... 715/702; 715/701; 715/703; 715/845; 715/713

(58) Field of Classification Search ................ 715/702, 715/701; 345/168, 184, 163
See application file for complete search history.

(56) References Cited

U.S. PATENT DOCUMENTS

| | | | | |
|---|---|---|---|---|
| 5,953,724 A | * | 9/1999 | Lowry | 707/102 |
| 5,956,016 A | * | 9/1999 | Kuenzner et al. | 345/156 |
| 6,483,500 B1 | * | 11/2002 | Choi et al. | 345/184 |
| 6,539,243 B1 | * | 3/2003 | Kimura et al. | 455/550.1 |
| 6,693,626 B1 | * | 2/2004 | Rosenberg | 345/168 |
| 6,697,044 B2 | * | 2/2004 | Shahoian et al. | 345/156 |
| 6,717,573 B1 | * | 4/2004 | Shahoian et al. | 345/161 |
| 6,750,877 B2 | * | 6/2004 | Rosenberg et al. | 715/701 |
| 6,864,877 B2 | * | 3/2005 | Braun et al. | 345/156 |
| 6,924,787 B2 | * | 8/2005 | Kramer et al. | 345/156 |
| 6,988,246 B2 | * | 1/2006 | Kopitzke et al. | 715/810 |

(Continued)

FOREIGN PATENT DOCUMENTS

EP 0 768 598 A1 4/1997

(Continued)

OTHER PUBLICATIONS

"Keys With Position and Force Feedback" IBM Technical Disclosure Bulletin, IBM Corp. New York, US, vol. 31, No. 2, Jul. 1, 1998, pp. 78-80, XP000051425.

*Primary Examiner*—Boris Pesin
*Assistant Examiner*—Brandon Parker
(74) *Attorney, Agent, or Firm*—Oblon, Spivak, McClelland, Maier & Neustadt, L.L.P.

(57) ABSTRACT

An apparatus for entering data into a computing device includes a graphical user interface that presents hierarchically organized information in a menu structure of at least two hierarchy levels, including a topmost hierarchy level and at least one further hierarchy level. The apparatus also includes at least two haptic keys, each having more than one state of activation. Each of the haptic keys is assigned to a particular hierarchy level. A first haptic key is assigned to the topmost hierarchy level. A menu on the topmost hierarchy level is directly accessible using the first haptic key. A menu on a hierarchy level higher than one that is currently presented on the graphical user interface is directly accessible using a haptic key assigned to the menu on the higher level, when a hierarchy level of the currently presented menu is one of the at least one further hierarchy level.

11 Claims, 3 Drawing Sheets

U.S. PATENT DOCUMENTS

Figure 1:
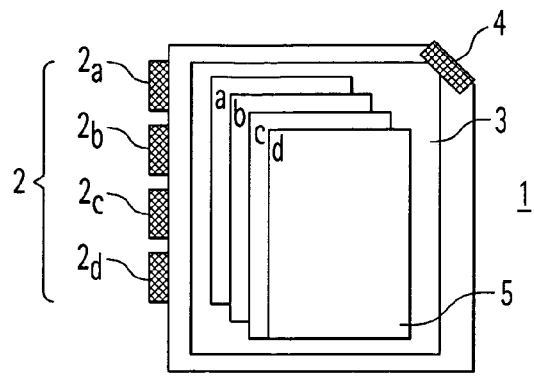

| | | | |
|---|---|---|---|
| 6,993,362 B1 * | 1/2006 | Aberg | 455/566 |
| 7,231,229 B1 * | 6/2007 | Hawkins et al. | 455/564 |
| 2001/0000668 A1 | 5/2001 | Bodnar | |
| 2002/0000668 A1 | 1/2002 | Sakihama et al. | |
| 2002/0041292 A1 * | 4/2002 | Son et al. | 345/810 |
| 2002/0054011 A1 * | 5/2002 | Bruneau et al. | 345/156 |
| 2002/0075135 A1 | 6/2002 | Bown | |
| 2003/0090456 A1 | 5/2003 | Lin | |
| 2003/0112224 A1 * | 6/2003 | Pan et al. | 345/171 |
| 2003/0122779 A1 * | 7/2003 | Martin et al. | 345/156 |
| 2003/0184574 A1 * | 10/2003 | Phillips et al. | 345/702 |
| 2004/0119755 A1 * | 6/2004 | Guibourge | 345/827 |
| 2004/0183782 A1 * | 9/2004 | Shahoian et al. | 345/163 |
| 2004/0217942 A1 * | 11/2004 | Grant | 345/161 |
| 2007/0035523 A1 * | 2/2007 | Cohen | 345/169 |

FOREIGN PATENT DOCUMENTS

| | | |
|---|---|---|
| EP | 1 118 930 | 7/2001 |
| EP | 1 182 535 A1 | 2/2002 |
| EP | 1 182 536 A1 | 2/2002 |
| EP | 1 182 539 A1 | 2/2002 |
| EP | 1 184 982 A1 | 3/2002 |
| EP | 1 333 362 | 8/2003 |

* cited by examiner

HAPTIC KEY CONTROLLED DATA INPUT

This application claims benefit of and priority to European Application No. 04 001 101.7, filed Jan. 20, 2004.

The present invention relates to a human-computer interface with haptic feedback for a swift information access in complex, hierarchically organised data structures.

One of the most common means of operating a graphical user interface (GUI) is through a cursor key arrangement. 'UP', 'DOWN', 'LEFT', and 'RIGHT' directions are assigned to particular keys, or particular ends of a single large key. 'Select' is typically chosen by a separate key. Another commonly used method in human-computer interaction, which is often used with PDAs (Personal Digital Assistant) is the stylus. This method employs the use of the a stylus much in the same manner as a pen. For purposes of navigation, direct selection can be employed where visible items are directly clicked. Alternatively scroll buttons can be used to move navigation entities embedded in the screen. The drawback of these systems is that both hands are required each time for entering data. Particularly for personal mobile handheld electronic devices such as a PDA or a mobile phone or for consumer electronic devices such as a remote control or a car navigation system, a one-hand operation is desired.

Some handheld devices therefore make use of a multifinger haptic interaction where one finger like e.g. the thumb rests on a dial while other keys along a side of the device can be selected by different fingers of the hand. For selecting an item within a menu presented by the GUI, the dial is used to move the cursor up and down the list of items. The final selection is then done by pressing one of the finger keys.

Some car navigation systems allow to navigate through the menus of a graphical user interface by means of a single haptic dial. Turning the dial results in browsing through a list. Pushing the dial causes a selection. Each time a user wants to go down one step in the menu hierarchy, one push of the dial is needed. Returning to higher levels in the hierarchy, usually requires to select an 'up'-menu item or icon on the screen. Finding the desired item in a complex and hierarchically organised data structure is a painstaking business in current one-hand human-computer interfaces. Going down one level in a hierarchy each time requires that a button is pushed once. Browsing through a list of items requires that the buttons are used as cursor keys. Changing to a different menu located in a different branch of the hierarchical structure requires to return to the first common higher-level menu whereby a button has to be pushed each time for returning to the next higher level.

In a different approach, as e.g. proposed by US 2001/0000668 A1 the operation of a mobile device with a restricted number of keys is achieved by assigning a specific function to each key, whereby the function depends on the state of the system and the GUI-context. This method, however, is not appropriate for deep hierarchy level menu operations, where similar terms are used for different functionalities. For example the term 'options' is often used as a menu item and may appear several times at different places in a menu structure for one and the same application. The functionalities which are accessed by 'options' depend however on the higher-level nodes of a given selected hierarchy. In order to know what a specific term 'options' stands for, it is therefore essential for a user to have a clear idea of the identity of the higher levels of the given hierarchy.

It is therefore an object of the present invention to overcome the above-explained drawbacks of human-computer interfaces and to provide a swift navigation for a user through a complex hierarchically organised data structure with a restricted number of keys.

This object is achieved by an apparatus for entering data into a computing device according to the independent claim.

The apparatus according to the invention includes at least two haptic keys with each having more than one state of activation, a graphical user interface for presenting hierarchically organised information to a user of the computing device, and a control means for controlling the generation of input data with respect to a haptic key selected, the current state of activation of selected haptic key and the information presented by the graphical user interface.

A haptic key is a key that exploits the human sense of touch and/or feedback to the muscles to provide a feedback to a user with respect to its current state of activation. This is usefully achieved by a force-feedback and/or by special echo features, like e.g. mechanically sensible clicks, which convey a feeling for the current state of a key activation to the human sense of touch.

The apparatus according to the present invention provides an improved interface for human-computer interaction enabling a context sensitive single action multiple command data entry. Advantageous embodiments of the present invention are the subject of other claims.

Particularly for handheld devices, the apparatus is equipped with four haptic keys enabling a swift operation with the four fingers opposite the thumb of a human hand. By arranging the haptic keys in a line at a first sidewall of the apparatus, a user is enabled to rest the four fingers of his hand opposite the thumb on the keys permanently, allowing to operate the keys without any delay.

In a preferred embodiment of the present invention, the apparatus comprises a fifth key with at least one distinguished state of activation prompting the control means to generate predefined input data irrespective of the information presented by the graphical user interface. Thus, a user can enter a command, which is not presented by the graphical user interface. For an ergonomic handling of the apparatus, the fifth key is preferably arranged at a second sidewall opposite the first sidewall. In a further advantageous embodiment of the present invention, the fifth key provides a jog dial function, which can e.g. be used to change between different functions assigned to the key or to change the assignment for the other haptic keys. In a further preferred embodiment of the present invention, the fifth key is made up as a haptic key.

For an efficient operation, each state of activation of a haptic key is assigned a defined range of pressure force applied to the haptic key. Hereby, each state of activation of a haptic key is preferably arranged in a sequence of subsequent states of activation.

To provide a clearly structured information, the information presented by the graphical user interface is organised as a menu structure of at least two hierarchy levels, whereby further advantageously, a menu on the topmost hierarchy level is directly selected by selecting a respective haptic key. An effective selection of the desired information is achieved by highlighting an item within a sequence of items in a menu selected by a corresponding haptic key according to its position in the sequence corresponding to the position of the state of activation activated in the sequence of subsequent states of activation provided by the haptic key.

In a further preferred embodiment of the present invention, a higher level menu contains items indicating an access to a collection of characters, and a lower level menu corresponding to the respective item presents each character for being selected with respect to a text input, thus allowing to enter text into an application without an alphanumeric keyboard by a restricted number of keys.

Figure 2:
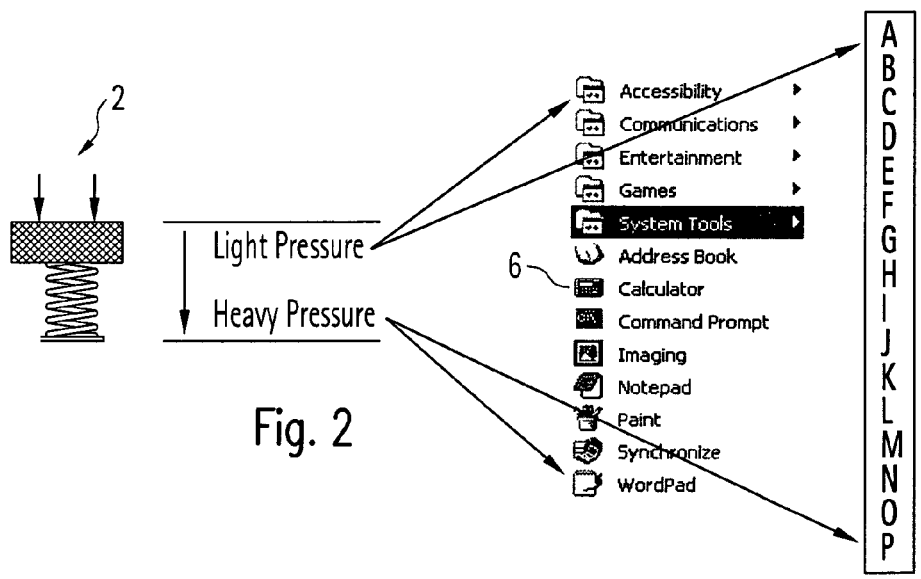
Figure 3:
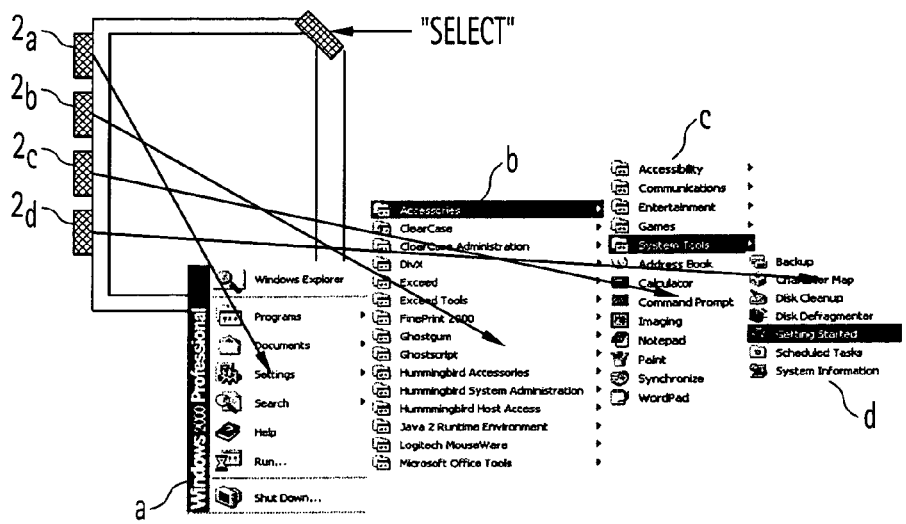
Figure 4:
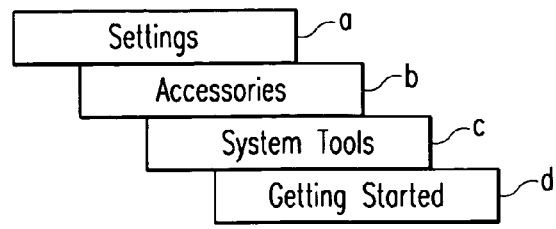
Figure 5:
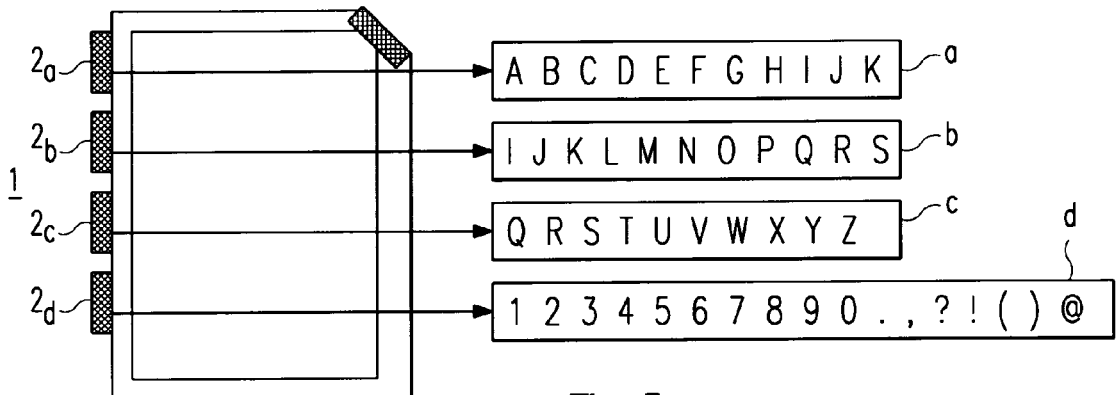
Figure 6:
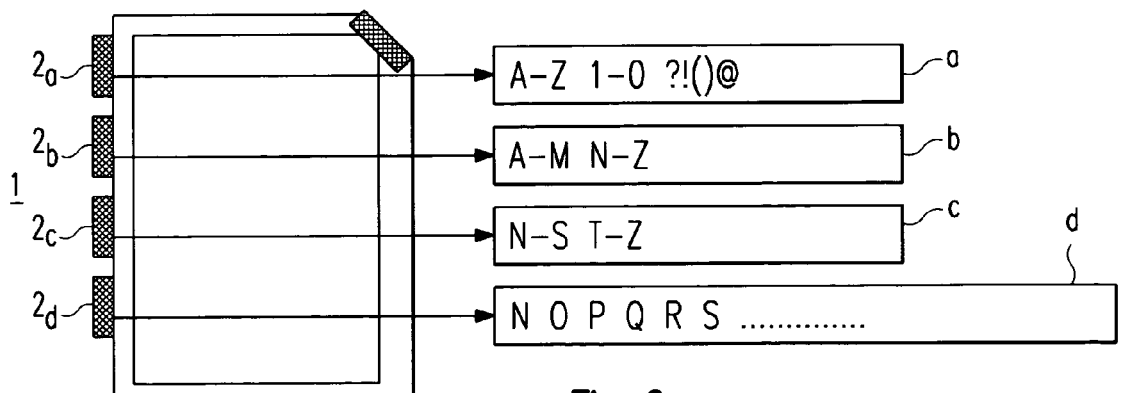
Figure 7:
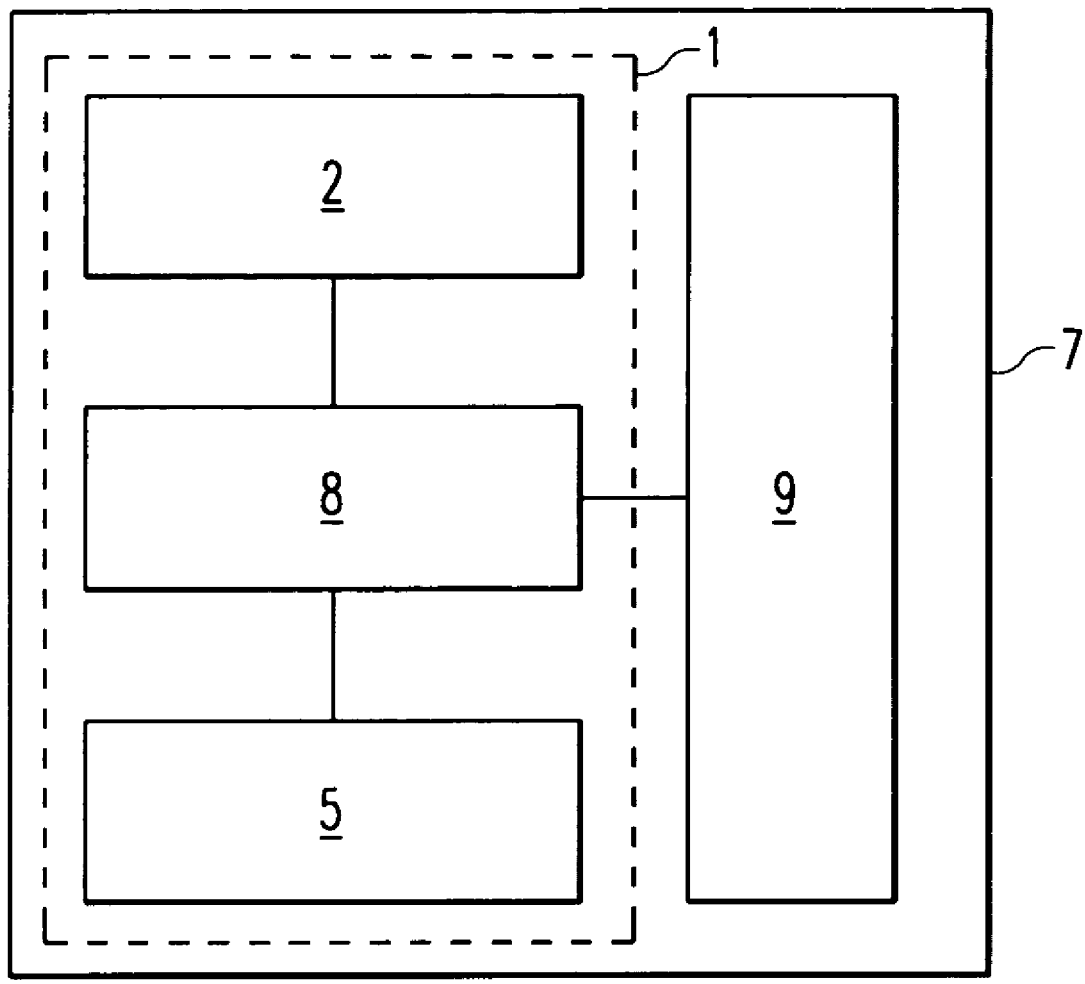

In the following description, the present invention is explained in more detail with respect to special embodiments in relation to the enclosed drawings, in which FIG. 1 shows a schematic representation of an apparatus according to the present invention, FIG. 2 shows an assignment of different states of activation of a haptic key to different pieces of information presented on a graphical user interface, FIG. 3 shows the assignment of different haptic keys to different hierarchy levels of the information presented on a graphical user interface, FIG. 4 shows an alternative solution for small screen graphical user interfaces, FIG. 5 shows an access scheme to a hierarchically structured character collection for text input, FIG. 6 shows an alternative hierarchical structure of characters for text input, and FIG. 7 shows a block diagram of a computing device according to the present invention.

An apparatus 1 for human-computer interaction according to the present invention is shown in FIG. 1. The apparatus provides a graphical user interface (GUI) 3, two or more haptic keys 2 and a separate key 4 on a side of the apparatus opposite to the haptic keys 2. The graphical user interface 3 is adapted to provide information in form of a hierarchical structure 5 known as hierarchical menu. In a preferred embodiment of the present invention, the human-computer interface 1 is adapted to fit in the hand of a user. Four haptic keys 2 are arranged vertically one above the other on a side wall of the apparatus 1 for being operated by the forefinger, middlefinger, ringfinger and the little finger, respectively. A thumb key 4 is provided on an upper edge of the apparatus 1 opposite the side wall supporting the four haptic keys 2 or alternatively directly on the side wall opposite the haptic keys 2 arrangement. The thus achieved ergonomic arrangement of keys allows a user to utilise each finger of one hand for a data input.

Each key is assigned to a particular hierarchical level of the menu structure. The top key, which is preferably operated by the forefinger, corresponds to the highest or topmost level of the menu structure, the second key from the top corresponds to the second level, the following key to the third level and the bottommost key to the fourth level of the menu structure.

When a user starts to search a certain entry, she or he as to access the hierarchical structure 5 by means of a certain item of the menu structure. For finding the respective item, a user will usually start on the topmost hierarchy level, select a suitable item in the list presented there, move then on to the corresponding sublevel and so on. For re-accessing the top-level menu, a user has to press the haptic key, which is assigned to the respective menu level. For menu level a this is e.g. haptic key $2_a$, for menu level b it is e.g. haptic key $2_b$, for menu level c this is e.g. haptic key $2_c$, and for menu level d this is e.g. haptic key $2_d$. Assumed the menu hierarchy is organised in four levels with a indicating the topmost level and d the bottommost level, then a user would enter the menu structure by pressing the haptic key $2_a$ and a graphical user interface will present the respective menu to the user. The menu contains a list of items, which either represent a command or refer to the next lower level in the menu structure. Each haptic key 2 provides a force-feedback requiring from the user an increased pressure for being pressed further down. A user thus gets an impression on how far down she or he currently presses a button. Parallel to the pushing movement of the haptic key, a graphical indication moves through the list of items presented on the graphical user interface. By holding a haptic key 2, the graphical indication, e.g. a highlighted representation of the menu item chosen, would stay fixed on the top item. Applying increasing pressure to the haptic key 2 would cause the highlighted item or the graphical indication, respectively, to move progressively down the list of items as indicated in FIG. 2. In a preferred embodiment of the present invention, a user is further able to feel a change from one item to the next by means of a tactual click like sensation, which is mechanically created on the haptic key.

When a desired menu item is found and highlighted, a user selects the respective item by holding the haptic key 2 in the respective position for a given period of time or alternatively by pressing the thumb key 4. The particular key 2 used for navigating in the menu is then mechanically blocked to prevent the selected item from being lost erroneously. If the item represents a command, the respective command is executed now. The blocking of the key is released after command execution or when increased pressure is put on the key.

If the menu item represents a reference to a lower level menu, a user navigates to the referenced menu by pressing the next following haptic key, which is assigned to the respective menu level. When the item has been selected in menu level a, it now references a menu in menu level b, which is entered by pressing the haptic, key $2_b$. The desired item in this menu is then selected with the same type of finger movement as described above. Again, when the desired item is found, the corresponding haptic key will be locked in addition to the previous one or ones, depending on the past history, and the corresponding menu of the next lower level is then opened with the next finger activating the next haptic key. Again, once the desired item has been selected, the procedure is repeated on the next haptic key. FIG. 3 contains a graphical representation of the just explained, indicating, that each of the haptic keys is assigned to a specific menu level of the menu hierarchy.

In case the last, i.e. in the example given the fourth menu, contains no item of interest, a user is able to re-navigate by only a single action that is applying a pressure to the haptic key assigned to the menu level he wishes to jump up. The haptic key operated lastly will then be disengaged from the lock position like all the haptic keys assigned to levels lower in the menu hierarchy than the jumped at one. A user can thus return to his initial position with just one operation, thus sparing the need for a time consuming backward navigation through the menu system. In an alternative embodiment, only the keys corresponding to the menus, which are subject to being discarded by the user, are released.

Particularly in mobile handheld devices with a small screen size, like e.g. cheque card size PDAs or mobile phones, the menu level hierarchy could be displayed alternatively as shown in FIG. 4. For each level, only one menu item is shown in a box, which changes by pressing the respective haptic key assigned to a respective menu level. Pressing e.g. the second haptic key, would simultaneously cause a change in the text of all boxes below level a.

A human-computer interface 1 according to the present invention is also adapted to provide a text input, which is optimised for small size handheld devices. For text input a variety of characters are required, like e.g. letters, numbers and special characters, necessary for instance for punctuation or e-mail addresses. The corresponding collection of characters is grouped, with the characters of each group being presented in a separate menu. When the text input mode is active, each of these menus can be directly accessed by a haptic key and the desired character is selected in the same way as a menu item described above.

In a first embodiment, the characters representing letters of the alphabet are divided into three groups, with the first group ranging e.g. from A to H, the second group from I to P, and the third group from Q to Z. The numbers and special characters are combined in a fourth group. For entering a certain character in a text editor on the graphical user interface, a user is hereto required to press the respective haptic key assigned to the menu containing the group with the desired characters. For the example shown in FIG. 5, if a user wants to input a letter of the first third of the alphabet, she or he would engage the top key. Applying a light pressure on the top haptic key will then cause the graphical user interface to indicate that the letter 'A' is ready for selection and by increasing the pressure, the graphical indicator will progressively move through the list of characters until the last character or letter of the group is reached. As soon as the correct letter is highlighted, it can be selected by e.g. using the thumb key. Since a user usually will not know where exactly one group ends and the next starts, an overlap between the groups will be provided so that letters and characters close to the end of a first group will also appear at the beginning of the following group. By this, a character located at the transition from one group to another group, can be accessed alternatively by either the haptic key for the preceding or the following group.

An alternative access scheme for text input is shown in FIG. 6. On the first level, the category like letters, digits or other symbols are selected. The desired category is selected using the haptic key assigned to the top level a. On the second level b, the grouping of the characters available for the selected category is indicated. On the next level c, a sub-grouping of the characters for the group selected in the above level is presented, and finally on the fourth level d, the characters belonging to the sub-group selected on the third level c are presented and can be chosen. Of course the described structure can also be implemented with using just three levels omitting either level b or c. The number of menu levels involved may also vary with the category, particularly when an extra category is used for punctuation characters.

The described text input system can be complimented by so-called 'guessing algorithms', which provide a text prediction as it is e.g. utilised for text input on certain mobile devices with a restricted number of keys as e.g. mobile phones. According to the guess of a respective algorithm, the order in which the options are presented in subsequent keys will then be rearranged according to the probability with which the presented characters are likely to be used. This will reduce the time required for text input.

Apart from accessing information organised in a multilevel menu structure, the haptic keys can also be used for navigating in differently organised graphical information. When e.g. an image is presented on the graphical user interface, the haptic keys 2 may be used for zooming, panning and browsing through a set of pictures. The first haptic key $2_a$ for instance will be used to zoom in and out of a picture, the second key $2_b$ for moving the picture left or right and the third key $2_c$ for moving the picture up and down. The fourth key $2_d$ might then be reserved for selecting the next or the previous picture.

The key arrangement of FIG. 1 can also be used with a traditional web browser on a small screen mobile device. Usually, the contents of an HTML page do not fit entirely on the screen of these devices. A possible key assignment will therefore be defined by:

first haptic key $2_a$: up/down scrolling
second haptic key $2_b$: left/right scrolling
third haptic key $2_c$: zoom in/zoom out
fourth haptic key $2_d$: jump to next/previous link contained in a current web page
thumb key 4: select a link When viewing a recorded video on a computing device, the key arrangement of the human-computer interface 1 according to the present invention will have the following assignment:

first haptic key $2_a$: jump to next/previous top-level segment/scene (provided these meta-data are available)
second haptic key $2_b$: jump to next/previous next level segment/scene (provided these meta-data are available)
third haptic key $2_c$: change speed of play-back/fast-forward FIG. 7 shows the components of a computing device 7 with a human-computer interaction interface 1 according to the present invention. The human-computer interface 1 includes a key section 2 comprising at least haptic keys $2_a$ and $2_b$, possibly further keys like $2_c$, $2_d$, and if provided the thumb key 4. The input of the key section 2 is provided to a controller unit 8, where the current status of activation of each haptic key is registered and interpreted according to the information displayed on the graphical user interface 5. Corresponding to the result of the interpretation, data are then created which are supplied to the computing section 9 as input data.

Up to now the function of the fifth key has been described as a simple operation key for initiating the execution of a selected command. This fifth key, or thumb key, respectively, may also be formed by a haptic key like the others described. This means, that it is carried out as a multifunctional key providing several states of activation, whereby each state of activation corresponds to a defined range of pressure force applied to the key. In a different embodiment, the key will be formed by a jog dial mechanism where the state of activation is changed by rotating the key and a further state of activation may be provided by a applying a pressure to the periphery of the dial into the direction of its rotational centre.

The thumb key may then be used for navigating through menu structures with more than four levels, and the haptic keys provided opposite the thumb key are used to directly access a respective level of the hierarchical structure section presented on the GUI 3. Once the lowest level presented on the GUI 3 is entered by a direct access haptic key, e.g. key $2_d$, the assignment of the haptic keys $2_a$ to $2_d$ is reassigned to the preceding or next following hierarchy levels.

The controller 8 of the apparatus 1 maintains a user profile, which records all actions and/or selections taken by a user. If a user presses and then holds e.g. the haptic key assigned for level a in a certain position X, then depending on the past preferred selection corresponding to the position X, the device 1 will automatically put the haptic keys assigned to the other levels in the respective position of this preferred past selection, and the selection will be displayed accordingly on screen.

The key arrangement described up to now and shown in FIG. 1 is the key arrangement of a human-computer interaction interface 1 preferred for a one-hand operation of small, handheld computing devices. But the respective apparatus 1 for entering data into a computing device may also be adapted for a two-hand operation for bigger hand-held devices like e.g. a web-pad or the like. The system can then be equipped with up to ten haptic keys whereby the thumb keys would preferably be placed at the front, and the keys for the other fingers would be located at the back of the device. The described human-computer interface 1 may further be combined with other input methods, like e.g. other types of keys, dials, stylus, touch screen or speech input or the like. It may further also be used in combination with a remote control.

The present invention improves the navigation through information presented in hierarchical menu levels by allowing to jump in points at intermediate stages of the navigation sequences. The provided human-computer interaction interface 1 further allows correction in form of a fast backtracking to be carried out more easily as in common menu navigation systems. At last, the presented apparatus 1 enables a one-hand operation of a hand-held computing device.

The invention claimed is:

1. An apparatus for entering data into a computing device, the apparatus comprising:
  a graphical user interface configured to display menus in a menu structure of at least two hierarchy levels, the menu structure including a topmost menu at a topmost hierarchy level and a further menu at at least one further hierarchy level;
  at least two haptic keys, each configured to receive a pressure to be pressed down, and each providing an increased force-feedback opposing the pressure as the respective haptic key is pressed further down, wherein the graphical user interface displays a graphical indication moving through the topmost menu or the further menu displayed on the graphical user interface, the graphical indication parallel in a position in the topmost menu or the further menu to a position of one of the at least two haptic keys resulting from the pressure opposing the increased force-feedback of the one of the at least two haptic keys; and
  control means for generating input data depending on an item of the menu structure selected using the one of the at least two haptic keys, wherein
  said control means generates input data causing the graphical user interface to move through the topmost menu on the topmost hierarchy level when a first haptic key of the at least two haptic keys receives the pressure,
  said control means generates input data causing the graphical user interface to move through the further menu on said at least one further hierarchy level when a second haptic key of the at least two haptic keys receives the pressure,
  the one of the at least two haptic keys is configured to be mechanically locked when the item of the menu structure is selected, and
  said control means generates input data causing the graphical user interface to return to a hierarchy level of the menu structure with a single operation of applying a pressure to one of the at least two haptic keys corresponding to the hierarchy level, whereby the one of the at least two haptic keys corresponding to the hierarchy level and each haptic key corresponding to a lower hierarchy level of the at least two hierarchy levels are disengaged.

2. The apparatus according to claim 1, wherein the at least two haptic keys are arranged in a line at a first sidewall of the apparatus.

3. The apparatus according to claim 1, wherein the apparatus comprises four haptic keys arranged vertically one above the other in a line on a first sidewall of the apparatus, and
  a fifth haptic key configured to have at least one distinguished state of activation prompting the control means to generate a predefined input data irrespective of information presented by the graphical user interface, wherein the fifth haptic key is arranged on an upper edge of the apparatus on a second sidewall opposite the first sidewall.

4. The apparatus according to claim 3, wherein the fifth key is configured to provide a jog dial function.

5. The apparatus according to claim 1, wherein said control means generates the input data depending on a defined range of the pressure applied to the one of the at least two haptic keys.

6. The apparatus according to claim 5, wherein said control means generates the input data causing the graphical user interface to move through the topmost menu or the further menu depending on a sequence of ranges of the pressure.

7. The apparatus according to claim 1, wherein the graphical user interface is configured to highlight an item, within the topmost menu or the further menu, selected by one of the at least two haptic keys according to a position of the highlighted item in the topmost menu or the further menu corresponding to a position of a state of activation activated in a sequence of subsequent states of activation provided by said one of the at least two haptic keys that selected the highlighted item.

8. The apparatus according to claim 1, wherein the graphical user interface is configured to display a higher-level menu containing items indicating a collection of characters, and to present a lower level menu, corresponding to a selected one of said items, that presents a plurality of characters to be selected with respect to a text input.

9. An apparatus for entering data into a computing device, the apparatus comprising:
  a graphical user interface configured to display menus in a menu structure of at least two hierarchy levels, the menu structure including a topmost menu at a topmost hierarchy level and a further menu at at least one further hierarchy level;
  at least two haptic keys each configured to receive a pressure to be pressed down, and each providing an increased force-feedback opposing the pressure as the respective haptic key is pressed further down, wherein the graphical user interface displays a graphical indication moving through the topmost menu or the further menu displayed on the graphical user interface, the graphical indication parallel in a position in the topmost menu or the further menu to a position of one of the at least two haptic keys resulting from the pressure opposing the increased force-feedback of the one of the at least two haptic keys; and
  a controlling unit configured to generate input data depending on an item of the menu structure selected using the one of the at least two haptic keys, and to generate input data that causes the graphical user interface to move through the topmost menu on the topmost hierarchy level when a first haptic key of the at least two haptic keys receives the pressure, said controlling unit being further configured to generate input data that causes the graphical user interface to move through the further menu on said at least one further hierarchy level when a second haptic key of the at least two haptic keys receives the pressure, wherein
  the at least one of the at least two haptic keys is configured to be mechanically locked when the item of the menu structure is selected, and
  the controlling unit is further configured to generate input data causing the graphical user interface to return to a hierarchy level of the menu structure with a single operation of applying a pressure to one of the haptic keys corresponding to the hierarchy level, whereby the one of the at least two haptic keys corresponding to the hierarchy level and each haptic key corresponding to a lower hierarchy level of the at least two hierarchy levels are disengaged.

10. A method, comprising:

displaying, with a graphical user interface, a menu structure of at least two hierarchy levels, the menu structure including a topmost menu at a topmost hierarchy level and a further menu at at least one further hierarchy level;

receiving a pressure at one haptic key of at least two haptic keys to press the one haptic key down;

providing an increased force-feedback opposing the pressure as the one haptic key is pressed further down;

displaying a graphical indication moving through the topmost menu or the further menu displayed on the graphical user interface, the graphical indication parallel in a position in the topmost menu or the further menu to a position of the one haptic key resulting from the pressure opposing the increased force-feedback of the one haptic key;

generating input data depending on an item of the menu structure selected using the one haptic key;

generating, with a processor, input data to cause the graphical user interface to move through the topmost menu on the topmost hierarchy level when a first haptic key of the at least two haptic keys receives the pressure;

generating, with a processor, input data to cause the graphical user interface to move through the further menu on said at least one further hierarchy level when a second haptic key of the at least two haptic keys receives the pressure;

mechanically locking the one haptic key when the item of the menu structure is selected; and generating, with a processor, input data to cause the graphical user interface to return to a hierarchy level of the menu structure with a single operation of applying a pressure to one of the at least two haptic keys corresponding to the hierarchy level, whereby the one of the at least two haptic keys corresponding to the hierarchy level and each haptic key corresponding to a lower hierarchy level are disengaged.

11. The apparatus according to claim 1, wherein, as the pressure presses the one of the at least two haptic keys further down, a tactual click is mechanically created on the one of the at least two haptic keys as the graphical indicator moves through a first item of the topmost menu or the further menu to a second item of the topmost menu or the further menu.

\* \* \* \* \*